Jan. 3, 1933.    M. BALDEWEG    1,893,122
ROLL FILM BOX CAMERA
Filed Nov. 5, 1931
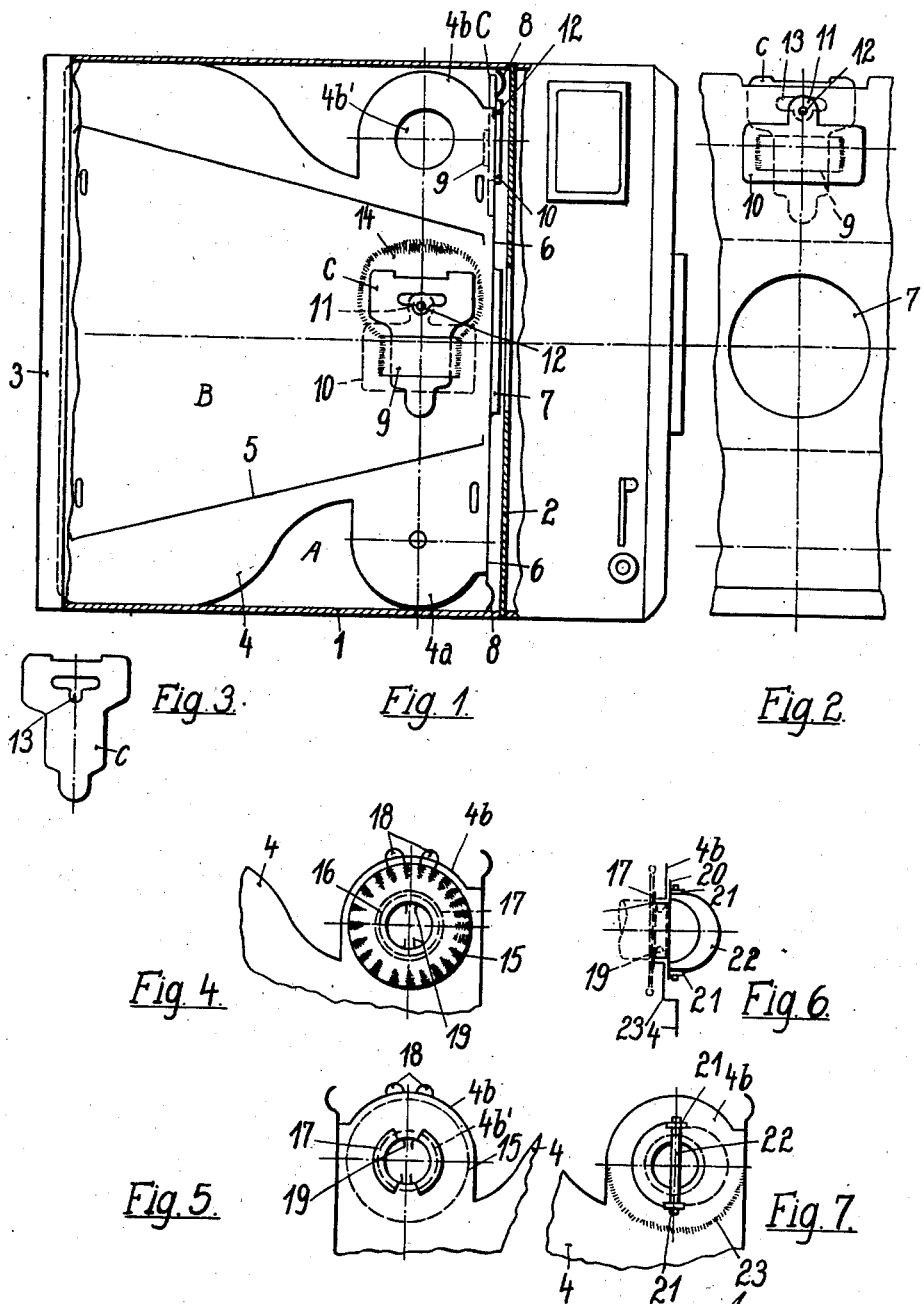

Patented Jan. 3, 1933

1,893,122

UNITED STATES PATENT OFFICE

MAX BALDEWEG, OF DRESDEN, GERMANY

ROLL FILM BOX CAMERA

Application filed November 5, 1931, Serial No. 573,260, and in Germany April 2, 1931.

The invention relates to roll-film box cameras with an insertion member for inserting a film removable from the camera casing and carrying the film spool support often quite near to its front wall. In these cameras the camera casing carries the film spool key, which is drawn back when the insertion member is removed or replaced after the (film) insertion, so that its front part clears the slotted end of the spool. Practice has now shown that with this type of camera. the insertion of the film presents considerable difficulties. It is usual to proceed by fitting the let-off spool into its bearing. then leading the paper strip supporting the film over the guide rollers and around the picture area frame to the other bearing in which an empty spool has already been laid. The tip of the paper strip is then threaded in and then incidentally rotation of the spool is attempted in order thus to prevent the slipping out of this strip end, that is, to commence the winding-on operation which is continued later, after pushing the insertion member into the camera, by the film spool key mounted on the same. The turning of the spool is however of the greatest difficulty because the neighbouring walls, particularly the end wall of the insertion member. prevents the grasping of the spool tube with the fingers in order to turn it.

Recognizing this drawback, the removable insertion member has already been omitted and instead the back wall made as a deep cap. But by this means, although the winding-on operation can be started by turning the spool key. the possibility is in turn created that light enters at this joint. It is also in this case a question of a different kind of box camera.

The invention presents the possibility, after inserting the film and without exercising particular dexterity. of starting the winding-on operation on the removed insertion member to such an extent that interference in the winding-on cannot afterwards take place and by such means that it provides an auxiliary key, particularly on the insertion member, besides the usual film spool key fixed to the camera wall on the camera, which permits of turning the take-up spool on the removed insertion member.

In the drawing several constructional examples of the invention are illustrated.

Fig. 1 shows in elevation and partly in section a box camera of the usual constructional type with the inserted insertion member in elevation.

Fig. 2 a part of the front wall in elevation.
Fig. 3 the key alone.

Figs. 4 and 5 show in side and back view another constructional form of an auxiliary key fitted to the supporting wall of the insertion member.

Figs. 6 and 7 show in side and rear view a third constructional form of an auxiliary key fitted to the supporting wall of the insertion member.

The camera 1 supports the shutter arrangement in its front part, shut off by the partition 2. Its hollow space A is closed by a rear wall 3 which can be swung back. The insertion member which fills the hollow space between the walls 2 and 3 is designated by B. It consists of the two side walls 4 and two inclined walls, the direction of which is apparent by the stamping lines 5. The side walls 4 also form the bearings 4a, 4b for the film spools. The insertion member furthermore has a front wall 6 which is provided with the admission opening 7 for the light rays and which otherwise extends at its ends 8 up to the horizontal walls of the camera 1.

According to Figs. 1 and 2 a kind of compartment is formed at the front wall 6 of the insertion member B by inwardly pressing a strip 9 cut out by the two parallel incisions, which is pressed through inwards to bridge form, in which a key C is inserted, which is shown separately in Fig. 3. As light could still enter the spool chamber by the cutting away of the pressed out strip 9, this portion is covered by a strip 10 which has an extension 11 with a locking nose 12 which engages through the end wall 6 into a notch 15 of the key C.

The same arrangement can, however, also be arranged on the side wall 4 as still further illustrated in Fig. 1, for which purpose this is pressed inwards there. This pressing is designated at 14. All the other parts are provided with the same reference characters as above.

In Figs. 4 and 5 a knurled disc 15 is arranged on the support 4b, which projects with a hub-shaped part 16 through the bore 4b' and is loosely rotatably fastened by outward bending of the marginal parts 17. The knurling on the disc or the projections 18 permit the rotation of the ring member 16 which exhibits successive lugs 19, that is, are bent inwards for the purpose of engaging in the slotted end of the spool tube. After the insertion of the insertion member B in the hollow space A, the spool key fastened to the camera and which is not here illustrated, engages through the hollow space of the ring member, which is approximately as large as the bore 4b', in the same manner as before. The weak lugs 19 do not prevent this operation.

In Figs. 6 and 7 the same reference characters are again used for the same parts as in Figs. 4 and 5. The ring member 16, 17, 19 loosely rotatably fastened in the bore 4b' of the supporting wall 4b here has lugs 21 in its part 20 beyond the wall 4b, in which a bail is mounted. This bail is so shaped that when it is swung sideways, it does not prevent the entry of the spool key of the camera not illustrated. The supporting wall 4b is in this constructional example bent at a right angle at 23 so that the auxiliary key 22 which of course subsequently turns with it, cannot in any way disturb the winding operation. The turned-down position of the key 22 is seen dotted in Fig. 7.

Having now particularly described and ascertained the nature of my said invention and in what manner the same is to be performed, I declare that what I claim is:—

1. In a camera, a removable roll holder, a roll key pocket formed on said roll holder, and a roll key removably fitted in said pocket.

2. In a camera, a removable roll holder, a roll key pocket adapted to contain a removable roll key, and a spring key latch means associated with the pocket for latching the removable key in position in the pocket.

3. In a camera, a removable roll holder having thin walls, one of said walls being provided with a pair of slits and the metal between the slits being offset from the adjacent wall to provide a roll key pocket.

4. In a camera, a removable roll holder having thin walls, one of said walls being provided with a pair of slits and the metal between the slits being offset from the adjacent wall to provide a roll key pocket, and a light tight cover plate covering the portion of said wall from which the pocket forming material has been offset.

5. In a camera, a removable roll holder having thin walls, one of said walls being provided with a pair of slits and the metal between the slits being offset from the adjacent wall to provide a roll key pocket, a light tight cover plate covering the portion of said wall from which the pocket forming material has been offset, said roll holder having a slot in the pocket carrying wall adjacent the pocket, and a spring tongue on the cover plate having an end extending through said slot to engage and hold a key positioned in the pocket.

MAX BALDEWEG.